United States Patent [19]

Gibbs et al.

[11] 4,351,929

[45] Sep. 28, 1982

[54] CRYSTALLIZABLE CONTROLLED COMPOSITION INTERPOLYMERS OF VINYLIDENE CHLORIDE AND METHYL METHACRYLATE AND METHOD OF PREPARING SAME

[75] Inventors: Dale S. Gibbs, Midland; Duane F. Foye, Merrill, both of Mich.

[73] Assignee: The Dow Chemical Company, Midland, Mich.

[21] Appl. No.: 262,265

[22] Filed: May 11, 1981

Related U.S. Application Data

[63] Continuation of Ser. No. 126,637, Mar. 3, 1980, abandoned, which is a continuation-in-part of Ser. No. 27,201, Apr. 5, 1979, abandoned, which is a continuation-in-part of Ser. No. 902,313, May 3, 1978, abandoned.

[51] Int. Cl.$^3$ .................. C08F 2/22; C08F 214/08
[52] U.S. Cl. ........................... 526/80; 526/87; 526/317; 526/329.3; 526/329.4
[58] Field of Search ............... 526/80, 87, 317, 328.5, 526/329, 329.1, 329.2, 329.3, 329.4

[56] References Cited

U.S. PATENT DOCUMENTS

| | | | |
|---|---|---|---|
| 2,160,945 | 6/1939 | Wiley | 260/80 |
| 2,407,946 | 9/1946 | Britton et al. | 260/84 |
| 2,956,047 | 10/1960 | MacPherson et al. | 526/80 |
| 3,107,237 | 10/1963 | Smith | 526/87 |
| 3,226,370 | 12/1965 | Poindepter | 526/317 |
| 3,248,374 | 4/1966 | Covington | 526/317 |
| 3,313,757 | 4/1967 | Trofimou et al. | 526/329.4 |
| 3,317,449 | 5/1967 | Issacs et al. | 260/29.6 |
| 3,328,330 | 6/1967 | Trofimou et al. | 260/29.6 T |
| 3,669,917 | 6/1972 | Ando et al. | 260/78 R |
| 3,817,780 | 6/1974 | Hinkamp et al. | 526/87 |
| 3,879,359 | 4/1975 | Hinkamp et al. | 526/87 |

*Primary Examiner*—Edward J. Smith
*Attorney, Agent, or Firm*—R. B. Ingraham

[57] ABSTRACT

Crystallizable, controlled composition interpolymers consisting essentially of (a) from about 88 to about 92 mole percent vinylidene chloride, (b) from about 8 to about 12 mole percent methyl methacrylate, and (c) up to about 3 weight percent, based on the combined weight of (a) and (b), of one or more ethylenically unsaturated comonomers; such interpolymers having a relative viscosity of at least about 1.40° at 25° C. as a 1 percent solution in tetrahydrofuran and being capable of forming substantially haze-free solutions when present in an amount of about 20 percent solids in a solvent mixture consisting of 65 percent by weight tetrahydrofuran and 35 percent by weight toluene.

4 Claims, No Drawings

CRYSTALLIZABLE CONTROLLED COMPOSITION INTERPOLYMERS OF VINYLIDENE CHLORIDE AND METHYL METHACRYLATE AND METHOD OF PREPARING SAME

CROSS-REFERENCE TO RELATED APPLICATION

This is a continuation of application Ser. No. 126,637, filed Mar. 3, 1980, now abandoned which is a continuation-in-part of application Ser. No. 27,201, filed Apr. 5, 1979, now abandoned which in turn is a continuation-in-part of application Ser. No. 902,313, filed May 3, 1978, now abandoned.

BACKGROUND OF THE INVENTION

While the homopolymer of vinylidene chloride is generally insoluble at room temperature in conventional organic solvents, e.g., in pure tetrahydrofuran, useful materials, soluble in solvents such as mixtures of tetrahydrofuran and toluene at room temperature, can be made by copolymerization of vinylidene chloride with lesser quantities of other monomers such as acrylonitrile, methacrylonitrile, methyl acrylate (other $C_2$–$C_{13}$ alcohol esters of acrylic or methacrylic acid, e.g., methyl methacrylate), vinylidene cyanide, acrylic acid, itaconic acid, and chloroacrylonitrile, vinyl chloride, vinyl bromide, vinylidene bromide and the like.

These materials find particular use in the cellophane industry where a very thin (usually 0.05 mil) coating of so-called "soluble" vinylidene chloride polymers is deposited from solvent such as the solvent combinations mentioned above, on one or both sides of cellophane. This thin coating serves several purposes in that it causes the cellophane film to be a good gas or water-vapor barrier film for packaging purposes where either a loss of or gain in gas or water content of the product would render the product less attractive for sale. In addition, the coating promotes retention of water (which acts as a plasticizer usually along with some glycol or glycerine) in the cellophane, thus helping to prevent brittle fracture of the film. Finally, such coatings provide a heat-sealable outer coating where cellophane, by its very nature, cannot be heat-sealed.

For cellophane manufacturers concerned with applying such thin coatings to cellophane, the solubility, heat-seal temperature, flexibility, and water-vapor transmission rate (WVTR) are particularly important properties. Usually the desired properties include as low a heat-seal temperature and WVTR as possible coupled with low temperature solubility in inexpensive solvents or solvent combinations.

Since the WVTR of a vinylidene chloride interpolymer is directly related to the mole percent of vinylidene chloride in the polymer, as the most important factor in the manufacture of such resins, it is advantageous to get the mole percent of vinylidene chloride as high as possible consistent with solubility in the desired workable solvent systems. Since high vinylidene chloride content means strong crystalline forces in the polymer, these two factors are diametrically opposed, i.e., high vinylidene chloride content, highly crystalline polymers being the least soluble but offering the lowest WVTR.

As the mole percent of vinylidene chloride is raised in a polymer series, it is obvious that a percentage range is reached where the polymers rapidly change from ones which are permanently amorphous or which crystallize only slowly and incompletely in coatings to ones which are highly crystalline and difficult to dissolve. Consequently, careful control over the polymer composition during polymerization is needed to avoid the formation of a higher vinylidene chloride content than intended, since such could result in polymers unsuitable for coating purposes due to insolubility or premature crystallization in solution. The tendency for such polymers to be insoluble or prematurely crystallize in solution may be measured by light transmission measurements of a 15 to 20 percent lacquer solution in, for example, a solvent mixture of 65 percent tetrahydrofuran and 35 percent toluene, after aging the solution at 25° C. for 24 hours, against a reference of the pure solvent mixture. Careful control of the percent light transmission, hereinafter called "haze", is essential for coating use of these polymers, especially those having a high mole percent vinylidene chloride, since the tiny insoluble crystals which cause the haze by incomplete dissolution also serve as nuclei for overall crystallization once the interpolymer has been deposited as a thin coating on a substrate. The rate of crystallization in a coating, which is affected by the number of nuclei present, is very important for commercial operations since a rate of crystallization which is too slow will result in blocking of the coated film (which is typically wound in large rolls long before crystallization is complete).

It is desirable, by judicious choice of comonomers and proper reaction methods to optimize the heat-seal temperature, WVTR-solubility relationship, and flexibility and approach an ideal composition for coating use. While much work has been done in the past to find these combinations of comonomers to use for copolymerization, and much effort has also been expended to find the best method of copolymerizing these comonomers to give the best combination of heat-seal temperature, flexibility, WVTR, and solubility, a combination of monomers and method for the polymerization thereof has now been discovered which is superior to anything known heretofore for attainment of optimum barrier, heat-seal and solubility properties in the absence of the use of a major proportion of acrylonitrile or methacrylonitrile.

SUMMARY OF THE INVENTION

The above and related advantages are provided, in accordance with the present invention, by crystallizable, controlled composition interpolymers consisting essentially of (a) from about 88 to about 92 mole percent vinylidene chloride, (b) from about 8 to about 12 mole percent methyl methacrylate, and (c) up to about 3 weight percent, based on the combined weight of (a) and (b), of one or more ethylenically unsaturated comonomers; said interpolymer having a relative viscosity of at least about 1.40 at 25° C. as a 1 percent solution in tetrahydrofuran and being capable of forming substantially haze-free solutions when present in an amount of about 20 percent solids in a solvent mixture comprising 65 percent by weight tetrahydrofuran and 35 percent by weight toluene as measured in terms of at least 85 percent transmission of the solution, after aging at 25° C. for a period of 24 hours, against a reference of the pure solvent mixture using an ultraviolet spectrophotometer operating at a wavelength of 640 nm said interpolymer having a minimum heat-seal temperature no greater than 140° C., and having a water-vapor transmission rate of no greater than 0.25 g/100 in²/24 hours when deposited as a coating from a tetrahydrofuran lacquer solution at a coating weight of 4 grams/meter$^2$.

The present invention also provides a particularly effective process for preparing, in aqueous emulsion, a crystallizable, controlled composition interpolymer consisting essentially of (a) from about 88 to about 92 mole percent vinylidene chloride, (b) from about 8 to about 12 mole percent methyl methacrylate, and (c) up to about 3 weight percent, based on the combined weight of (a) and (b), of one or more ethylenically unsaturated comonomers; said interpolymer having a relative viscosity of at least about 1.40 at 25° C as a 1 percent solution in tetrahydrofuran and being capable of forming substantially haze-free solutions when present in an amount of about 20 percent solids in a solvent mixture consisting of 65 percent by weight tetrahydrofuran and 35 percent by weight toluene as measured in terms of at least 85 percent transmission of the solution, after aging at 25° C for a period of 24 hours, against a reference of the pure solvent mixture using an ultraviolet spectrophotometer operating at a wavelength of 640 nm; said interpolymer having a minimum heat-seal temperature no greater than 115° C, and having a water-vapor transmission rate of no greater than 0.25 g/100 in $^2$/24 hours when deposited as a coating from a tetrahydrofuran lacquer solution at a coating weight of 4 grams/meter$^2$; said process comprising the sequential steps of (1) polymerizing a primary monomer mixture consisting essentially of from about 88 to about 92 mole percent vinylidene chloride and from about 8 to about 12 mole percent methyl methacrylate in an aqueous polymerization medium containing an emulsifier, a polymerization initiator, and, optionally, a polymerizable acid; wherein (A) from about 35 to about 45 percent of the primary monomer mixture is added to the aqueous medium at a rate sufficient to continuously provide an excess of unreacted monomer in the aqueous medium, and (B) the remainder of the primary monomer mixture is added to the aqueous medium at a rate sufficient to continuously preclude the presence of an excess of unreacted monomer in the aqueous medium, and (2) following the addition of substantially all of the primary monomer mixture, adding an end-shot comonomer to the polymerization medium in an amount and under conditions sufficient to control composition drift in the crystallizable interpolymer.

DETAILED DESCRIPTION OF THE INVENTION

The crystallizable, controlled composition interpolymers of the present invention are effectively prepared in an aqueous emulsion polymerization medium containing conventional types of emulsifiers and initiators (and, optionally, a polymerizable acid such as acrylic acid, itaconic acid, or methacrylic acid) in amounts typically used in the preparation of vinylidene chloride polymers. In accordance with conventional practice, the aqueous medium will be maintained throughout the reaction period at a temperature conducive to polymerization at an acceptable rate. Such temperatures will generally range from about 30° C. to about 75° C. and, preferably, from about 40° C. to about 55° C.

A most advantageous process for obtaining interpolymers having the combination of properties required by the present invention comprises a first step of adding the primary monomer mixture (i.e., from about 88 to about 92 mole percent vinylidene chloride and from about 8 to about 12 mole percent methyl methacrylate) to the aqueous polymerization medium in a manner such that (A) from about 35 to about 45 weight percent of the primary monomer mixture is first added at a rate sufficient to continuously provide an excess of unreacted monomer in the medium (i.e., a "flooding" stage) and then (B) the remainder of the primary monomer mixture is added at a rate sufficient to continuously preclude the presence of an excess of unreacted monomer in the medium (i.e., a "starved" stage). This polymerization technique appears to be necessary in order to obtain interpolymers having a relative viscosity above 1.40, preferably between about 1.45 and 1.50, at 25° C. as a 1 percent solution in tetrahydrofuran, which is necessary for the formation of coatings having adequate flexibility. In contrast, interpolymers comprising primarily vinylidene chloride and methyl methacrylate made by prior known techniques are characterized by a lower molecular weight, i.e., relative viscosities at 25° C. significantly less than 1.40, resulting in coatings having inadequate flexibility.

The aforementioned "first step" of the process can be accomplished by continuously introducing the primary monomer mixture to the aqueous polymerization medium in a manner such that the ratio of vinylidene chloride to methyl methacrylate being added remains substantially constant throughout the entire period of addition. Alternatively, the ratio of vinylidene chloride to methyl methacrylate can be moderately varied during the period of addition (e.g., by increasing the amount of vinylidene chloride added during the initial period of the flooding stage) so long as the relative amounts of total monomer added during both the flooding stage and the starved stage remains in the prescribed range of about 88 to about 92 mole percent vinylidene chloride and about 8 to about 12 mole percent methyl methacrylate.

In order to provide better control over particle size, it is advantageous to initially form a seed emulsion within the aqueous medium and then continuously add monomers in the manner described. If desired, the seed emulsion can be provided by adding to the aqueous medium preformed polymeric seed particles which are advantageously formed from a monomer composition substantially the same as the primary monomer mixture. Preferably, however, the seed emulsion is provided by initially introducing a small amount, usually about 4 to about 6 weight percent, of the primary monomer mixture to the aqueous medium, followed by the prescribed addition and polymerization of the remaining amount of the primary monomer mixture. Since the seed step in the latter technique is essentially a small batch reaction in which composition is likely to drift due to the unequal reactivity ratios between vinylidene chloride and methyl methacrylate, it is most advantageous to begin continuous addition of the remainder of the primary monomer mixture as soon as the seed reaction shows any signs of drifting in composition as indicated, for example, by a pressure drop in the head space within the reactor. Generally, the addition of the remainder of the primary monomer mixture should be started as soon as a pressure drop of about 2 psi (0.14 kg/cm$^2$) occurs in the reactor.

Due to the unequal reactivity between the monomers, methyl methacrylate polymerizes and enters the interpolymer much faster than vinylidene chloride. Consequently, the polymer being formed after the end of the primary monomer mixture addition drifts higher and higher in vinylidene chloride content. At some point, such drift towards higher vinylidene chloride content will render the interpolymer insoluble in the solvent system chosen for end-use coating purposes. Even though this point of insolubility will vary with the solvent strength of a particular solvent or mixture of solvents, for any given solvent system, there will be a threshold composition at which solutions of the interpolymer will be unstable and appear hazy. This may be called the "haze threshold". It is one of the unique characteristics of the process of the present invention that interpolymer composition drift during polymerization can be controlled so as to avoid the formation of a haze threshold composition while permitting sufficient drift towards high vinylidene chloride content to nucleate crystallization in coatings prepared from the interpolymers.

With regard to such crystallization nucleation, it is most advantageous for commercial film-coating operations that the coatings prepared from the interpolymers of the present invention crystallize in a sufficiently short period of time to permit rapid coating and subsequent roll-winding speeds without resulting in blocking of the wound film. Furthermore, it is advantageous that such coatings crystallize rapidly enough to achieve maximum barrier and heat-seal strength within a reasonably short period of time to enable the coated films to be used for end-use applications as soon as possible after the coating operations are completed.

With regard to haze threshold, the interpolymers of the present invention must be capable of yielding substantially haze-free solutions when present in an amount of about 20 percent by weight in a solvent mixture comprising 65 percent by weight tetrahydrofuran and 35 percent by weight toluene, as measured in terms of at least 85 percent transmission of the solution, after aging at 25° C. for a period of 24 hours, against a reference of the pure solvent mixture using an ultraviolet spectrophotometer operating at a wavelength of 640 nm.

In order to achieve the prescribed balance between haze threshold and crystallization nucleation, it is essential for the process of this invention that, following the addition of substantially all the primary monomer mixture, one or more ethylenically unsaturated comonomers is added to the aqueous medium in an amount and under conditions sufficient to control drift in the interpolymer composition. (For convenience only, this step of the process will be hereinafter referred to as the "end-shot" step.)

Comonomers which can be used in the end-shot step include any ethylenically unsaturated monomers which are copolyermizable with vinylidene chloride and which will effectively control drift in the interpolymer composition without substantially decreasing the beneficial properties, such as barrier, of the resulting interpolymers. Since it is expected that there are some ethylenically unsaturated comonomers, such as acrylonitrile, which might not suitably control composition drift when used alone, but which could be used effectively in combination with one or more monomers (such as, for example, a mixture of 75 weight percent acrylonitrile and 25 weight percent methyl acrylate), the term "end-shot comonomer" is intended to include single monomers as well as mixtures of monomers which perform in the manner described. Particularly preferred end-shot comonomers which can be employed include, for example, methyl acrylate, methyl methacrylate, vinyl acetate, vinyl propionate, methacrylic acid, and vinyl chloride.

The amount of end-shot comonomer needed to control drift in the interpolymer composition will vary with the relative reactivity of the particular comonomer or comonomers chosen as well as the rate of polymerization initiation and the rate of addition to the aqueous medium. Typically, the amount of end-shot comonomer will range from about 1 to about 3 percent of the weight of the primary monomer mixture.

Preferably, the addition of the end-shot comonomer to the aqueous medium is begun substantially immediately after all of the primary monomer mixture has been added. If desired, however, the addition of the end-shot comonomer can be started either a short time before or a short time after the addition of the primary monomer mixture has been completed. The rate at which the end-shot comonomer is added to the aqueous medium should advantageously be synchronized with the polymerization occurring therein so that sufficient comonomer is always available during the end-shot step to control composition drift. Accordingly, the rate of addition of the end-shot comonomer will vary with the reactivity of the particular comonomer or comonomers employed as well as the rate of initiation within the aqueous medium. Typically, the rate of addition will be such that the necessary total amount of end-shot comonomer is added continuously to the aqueous medium over a period of about $\frac{1}{4}$ to about 3 hours depending upon the initiation rate; i.e., from about 1 to about 3 hours when the rate of initiation is relatively slow and from about $\frac{1}{4}$ to about 2 hours when the rate of initiation is relatively fast.

The rate of initiation can be increased (and, accordingly, the rate of addition can be increased) during the end-shot step, for example, by adding an additional amount of polymerization initiated to the aqueous medium just prior to or concurrent with the addition of the comonomer during the end-shot step. Alternatively, if an initiator, such as sodium persulfate, has been used during the first polymerization step, the rate of initiation can be increased during the end-shot step by continuously adding a material, such as sodium bisulfite, which forms a redox system with that initiator. Other methods for increasing the rate of initiation will be readily apparent to those skilled in the art.

Conventional amounts and types of emulsion polymerization initiators, emulsifiers, and other additives may be used in the process of the present invention. Small amounts of other monomeric materials, such as the aforementioned polymerizable acids, may be added during the prescribed polymerization reaction, providing such materials do not substantially interfere with the reaction mechanism or substantially decrease the beneficial properties of the final interpolymer prescribed herein.

Polymer compositions in accordance with the present invention advantageously generally exhibit minimum heat-seal temperatures of below about 140° C. Beneficially such minimum heat-seal temperatures are below about 125° C. and desirably most advantageously such minimum heat-seal temperatures are below about 115° C.

The following examples, wherein all parts and percentages are by weight unless otherwise indicated, illustrate the present invention, but are not to be construed as limiting its scope.

EXAMPLE 1

A. Preparation of Vinylidene Chloride (VDC)/Methyl Methacrylate (MMA) Interpolymers A crystallizable, controlled composition VDC/MMA interpolymer was prepared by emulsion polymerization conducted in a one-gallon reactor. The initial aqueous polymerization medium consisted of the following ingredients:

1513.00 grams of distilled water
17.30 grams emulsifier (80% active) (dihexyl ester of sodium sulfo-succinic acid)
4.13 grams emulsifier (38% active) (sodium 2-ethylhexyl sulfate)
9.20 grams sodium persulfate
9.80 grams itaconic acid The reactor was evacuated for 15 minutes while the aqueous medium was heated to 45° C. With the reactor at 45° C. and the vacuum shut off, 121 grams of a 2000 gram primary monomer mixture composed of 90/10 VDC/MMA in weight percent was rapidly pumped into the reactor for the formation of a seed latex. The seed latex reaction was allowed to proceed until there was a 2 psi (0.14 kg/cm$^2$) pressure drop from the maximum pressure during the seed reaction. Immediately thereafter, the remainder of the primary monomer mixture was introduced at 121 grams per hour for a period of about 5 hours to continuously provide an excess of unreacted monomer, i.e., a "flooding" stage, and then at a rate of about 121 grams per hour wherein no excess of unreacted monomer was present in the polymerization medium, i.e., a "starved" stage. After the primary monomer mixture feed stream was shut off, a methyl methacrylate end-shot was pumped into the reactor over a period of approximately three hours in an amount sufficient to provide 2½ weight percent methyl methacrylate, based on the weight of the primary monomer mixture. This was immediately followed by addition of a 2 weight percent solution of sodium bisulfite at 25 grams/hour and a 3 percent solution of sodium persulfate at 25 grams/hour for two hours. Thereafter, the reactor was cooled to 25° C. and the latex was ready for coagulation. The process by which the so-formed interpolymer was obtained will be hereafter identified as Experiment (1)(A).

Similar good results were obtained by using an end-shot step which consisted of adding, immediately after the primary monomer mixture stream was shut off, 1.5 weight percent methyl methacrylate (MMA), based on the total weight of the primary monomer mixture, over a period of ½ hour while concurrently adding a 3 percent solution of sodium persulfate and a 2 percent solution of NaHSO$_3$ at 25 grams/hour each and, thereafter, continuing to add the sodium persulfate and NaHSO$_3$ over a 1½ hour period after the MMA stream was shut off.

B. Recovery of the Interpolymer from the Latex

The interpolymer formed in Experiment (1)(A) was recovered from the latex by a conventional CaCl$_2$ coagulation technique: 35 cc of 32 percent CaCl$_2$ solution was added to 900 cc of water and the mixture heated to 40° C. Thereafter, 300 cc of latex was added to the mixture with vigorous stirring and the temperature was increased to 80° C. and held there for 20 minutes. The mixture was then quenched with ice and the interpolymer collected and washed in a centrifuge. The interpolymer was dried to about 1 percent water, and was ready for evaluation.

C. Test for Solubility of the Interpolymer (Haze Stability)

Insolubility of the polymer manifests itself as the polymer crystallizes and causes the solution to be hazy. Though the polymer may go into solution initially, high VDC fractions tend to crystallize out to develop the characteristic haze. To be useful, the polymer must not develop hazy solutions upon standing for 24 hours at 25° C. after dissolving for a period of about 30 minutes in a solvent maintained at a temperature of about 30° C. The haze or turbidity of 19.5 percent lacquer in a 65/35 tetrahydrofuran (THF)/toluene (Tol) solvent mixture was measured using a Beckman Model 25 UV Spectrophotometer at a wavelength of 640 nm. Haze values were taken initially and at 24 hours for the 19.5 percent solutions. The haze values are reported as percent transmission against a reference of the pure solvent mixture. The lower the transmission value, the higher the haze development. Solutions below 85 percent transmission tend to cause haze in the coatings.

D. Testing Coating Performance

Coating tests were conducted on coated polyester film. The film was coated with a 19.5 percent interpolymer lacquer solution using THF. The coating weight was adjusted to 4 grams/meter$^2$. The coated film was aged 16 hours at 60° C. to insure development of crystallinity before testing the coating.

The permeability to water vapor (WVTR) was measured with a Riegel-Mocon Model IRD-2 Infrared Diffusometer. The data are reported as grams of H$_2$O passed through 100 in$^2$ of coated film in 24 hours for the coating weight of 4 grams/meter$^2$.

A Robot automatic controlled air-operated jaw sealer was used for measuring the minimum heat-seal temperature (MHST). Heat-seals were made at 5 degree intervals between 95° C. and 135° C. using 20 psi (1.4 kg/cm$^2$) jaw pressure and one second dwell time. The MHST is the temperature at which coating deformation is first observed when the seal is opened.

The following Table I sets forth the composition of the interpolymer, the haze stability of solutions thereof, and the minimum heat-seal temperature and WVTR of coatings prepared therefrom. For purposes of comparison with the interpolymer of Experiment (1)(A), a series of additional interpolymers (identified in Table I as Experiments B through F) were tested substantially as described above. The interpolymers of Experiments B through D were prepared by a polymerization technique substantially the same as that described in U.S. Pat. No. 3,879,359. The interpolymers of Experiments E and F were prepared in a manner substantially the same as Experiment (1)(A) except for the changes indicated in Table I.

TABLE I

| Experiment No. | Composition Mole % | | | | Rel. Visc. | MHST °C. | WVTR g/100 in²/ 24 Hours | Lacquer Haze % Transmission | |
|---|---|---|---|---|---|---|---|---|---|
| | VDC | MAN | MMA | VCN | | | | Initial | 24 Hours |
| For Comparison | | | | | | | | | |
| B | 92 | | 5.6 | 2.4 | 1.46 | 115-120 | 0.12 | 96 | gels |
| C | 90 | 7 | 3 | | 1.40 | 130 | 0.21 | 98 | low |
| D | 92 | | 4 | 4 | 1.47 | 125 | 0.17 | 96 | gels |
| E | 90.3 | | 9.7 | | 1.24 | 120 | 0.26 | 96 | 20 |
| (1.5 Hours Flooded No End-Shot) | | | | | | | | | |
| F | 90.3 | | 9.7 | | 1.42 | 110 | 0.21 | 95 | 20 |
| (5 Hours Flooded No End-Shot) | | | | | | | | | |
| The Invention | | | | | | | | | |
| A | 90.3 | | 9.7 | | 1.47 | 110 | 0.20 | 99 | 95 |
| (5 Hours Flooded Plus 2.5% End-Shot MMA in 3 Hours) | | | | | | | | | |

VDC = Vinylidene Chloride
MAN = Methacrylonitrile
MMA = Methyl Methacrylate
VCN = Acrylonitrile As demonstrated by the data in Table I, the comparative interpolymers of Experiments B, C, D, E and F are all characterized by insufficient haze stability and higher heat-seal temperatures than the interpolymer of the present invention. Note in particular that in Experiment E, the short flooding stage and the lack of an end-shot comonomer resulted in, respectively, an undesirably low relative viscosity and poor haze stability. Also note that in Experiment F, the flooding stage was sufficient to produce the required relative viscosity but the lack of an end-shot comonomer resulted in poor haze stability.

EXAMPLE 2

In each of a series of additional experiments, vinylidene chloride/methyl methacrylate interpolymers were prepared in a manner substantially the same as Experiment (1)(A), but using a series of different comonomers in the end-shot reaction. The following Table II sets forth the type of comonomer used, the minimum heat-seal temperature, WVTR, and lacquer haze stability of such compositions.

TABLE II

| End-Shot Comonomer And Wt % | Relative Viscosity | MHST °C. | WVTR g/100 in²/ 24 Hours | Lacquer Haze % Transmission | |
|---|---|---|---|---|---|
| | | | | Initial | 24 Hours |
| 3% MMA | 1.47 | 110 | 0.20 | 99 | 95 |
| 3% MA | 1.44 | 110-115 | 0.22 | 98 | 95 |
| 3% VA | 1.49 | 105-110 | 0.25 | 99 | 95 |
| 3% VCl | 1.46 | 110 | 0.25 | 99 | 95 |
| None (For Comparison) | 1.42 | 110 | 0.21 | 95 | 20 |

MMA = Methyl Methacrylate
MA = Methyl Acrylate
VA = Vinyl Acetate
VCl = Vinyl Chloride
All end-shots made to 90/10 weight percent VDC/MMA over a 2 hour period.

The data in Table II show that monomers having broad differences in structure and different reactivities with VDC can be used to control composition drift to prevent haze while at the same time permitting sufficient drift towards high VDC content to nucleate crystallization. The reactivity ratios of such monomers are as follows:

| $M_1$ | $r_1$ | $M_2$ | $r_2$ |
|---|---|---|---|
| vinylidene chloride | 1 | methyl acrylate | 1 |
| vinylidene chloride | 3.6 | vinyl acetate | 0.03 |
| vinylidene chloride | 3.2 | vinyl chloride | 0.3 |
| vinylidene chloride | 0.24 | methyl methacrylate | 2.53 |

EXAMPLE 3

In each of a series of additional experiments, vinylidene chloride/methyl methacrylate interpolymers were prepared in a manner substantially the same as Experiment (1)(A), but varying the amount of end-shot comonomer and/or the rate of addition during the end-shot polymerization step.

The following Tables III and IV set forth the results obtained. Such data indicate that, under the conditions of these experiments, the addition of too little comonomer did not adversely affect permeability, but it failed to adequately prevent haze. On the other hand, the addition of excessive amounts of comonomer increased the permeability of the interpolymers. Such data further indicate that for a given rate of initiation and amount and type of comonomer, there is an optimum rate of addition that can be employed to obtain interpolymers having the properties required by the present invention. It should be noted, for example, that if a higher rate of initiation had been used in the 2% end-shot experiment in Table III, the resulting haze value would have improved.

Further note that, under the conditions of the experiments of Table IV, the barrier generally improved as the rate of addition was decreased (i.e., as the total period over which the end-shot comonomer was added increased). In this regard, the interpolymers of the present invention will preferably have, in addition to the required haze and relative viscosity properties, a MHST no greater than about 115° C. and a WVTR no greater than about 0.25 g/100 in²/24 hours when deposited as a coating from a tetrahydrofuran lacquer solution at a coating weight of about 4 grams/meter². It will be appreciated that the interpolymers satisfying these stringent tests for MHST and WVTR will be eminently suited for commercial coating applications which generally employ solvent mixtures, for example, a mixture of 65 percent tetrahydrofuran and 35 percent toluene.

TABLE III

| End-Shot Comonomer And Wt % | Relative Viscosity | MHST °C. | WVTR g/100 in²/ 24 Hours | Lacquer Haze % Transmission | |
|---|---|---|---|---|---|
| | | | | Initial | 24 Hours |
| For Comparison | | | | | |
| None | 1.42 | 110 | 0.21 | 95 | 20 |
| 2% MA | 1.56 | 110 | 0.20 | 99 | 30 |
| The Invention | | | | | |
| 3% MA | 1.44 | 115 | 0.22 | 98 | 95 |
| 4% MA | 1.75 | 110 | 0.26 | 99+ | 99 |

MA = Methyl Acrylate
All end-shots made to 90/10 weight percent VDC/MMA interpolymers over a 1 hour period.

TABLE IV

| End-Shot Add Time (Hours) | WVTR g/100 in²/24 Hours | | |
|---|---|---|---|
| | 2% MMA | 3% MMA | 4% MMA |
| 1 | 0.22 | 0.27 | 0.30 |
| 2 | 0.20 | 0.25 | 0.27 |
| 3 | 0.21 | 0.24 | 0.28 |
| End-Shot Add Time (Hours) | MHST °C. | | |
| 1 | 100 | 100 | 100 |
| 2 | 100 | 105-110 | 115 |
| 3 | 110 | 115 | 115 |

All end-shots made to 90/10 weight percent VDC/MMA interpolymers.

EXAMPLE 4

Employing the procedure of Example 1, a plurality of batches of polymer composition in accordance with the present invention were prepared utilizing a 750 gallon reactor. The monomer charge employed was 90.7 weight percent vinylidene chloride and 9.3 weight percent methyl methacrylate. An end shot of 2.3 weight percent methyl methacrylate based on the weight of the initial monomer feed stream was added over a period of 3 hours after the mixed monomer stream had been added to the reactor. The results of barrier and minimum heat-seal temperature are set forth in Table V.

TABLE V

| Run | Barrier MVTR, gm. H₂O/100 in²/ 24 hours | Minimum Heat-Seal Temperature, °C. |
|---|---|---|
| 1 | 0.14 | 135 |
| 2 | 0.17 | 125 |
| 3 | 0.22 | 125 |
| 4 | 0.20 | 125 |
| 5 | 0.24 | 115 |

The interpolymers of the present invention are ideally suited for coating plastic films and molded articles and particularly for coating cellophane and polyester films. Other base films, such as polypropylene, can also be used.

What is claimed is:

1. A process for preparing, in aqueous emulsion, a crystallizable, controlled composition interpolymer consisting essentially of (a) from about 88 to about 92 mole percent vinylidene chloride, (b) from about 8 to about 12 mole percent methyl methacrylate, and (c) up to about 3 weight percent, based on the combined weight of (a) and (b), of one or more ethylenically unsaturated comonomers; said interpolymer having a relative viscosity of at least about 1.40 at 25° C. as a 1 percent solution in tetrahydrofuran and being capable of forming substantially haze-free solutions when present in an amount of about 20 percent solids in a solvent mixture consisting of 65 percent by weight tetrahydrofuran and 35 percent by weight toluene as measured in terms of at least 85 percent transmission of the solution, after aging at 25° C. for a period of 24 hours, against a reference of the pure solvent mixture using an ultraviolet spectrophotometer operating at a wavelength of 640 nm said interpolymer having a minimum heat-seal temperature no greater than 115° C., and having a water-vapor transmission rate of no greater than 0.25 g/100 in²/24 hours when deposited as a coating from a tetrahydrofuran lacquer solution at a coating weight of 4 grams/meter²; said process comprising the sequential steps of:

(1) polymerizing a primary monomer mixture consisting essentially of from about 88 to about 92 mole percent vinylidene chloride and from about 8 to about 12 mole percent methyl methacrylate in an aqueous polymerization medium containing an emulsifier, and a polymerization initiator; wherein
(A) from about 35 to about 45 percent of the primary monomer mixture is added to the aqueous medium at a rate sufficient to continuously provided an excess of unreacted monomer in the aqueous medium, and
(B) the remainder of the primary monomer mixture is added to the aqueous medium at a rate sufficient to continuously preclude the presence of an excess of unreacted monomer in the aqueous medium, and
(2) following the addition of substantially all of the primary monomer mixture, adding an end-shot comonomer to the polymerization medium in an amount and under conditions sufficient to control composition drift in the crystallizable interpolymer.

2. The process of claim 1 wherein the end-shot comonomer is added in an amount of from about 1 to about 3 weight percent based on the total weight of the primary monomer mixture of step (1).

3. The process of claim 2 wherein the primary monomer mixture of step (1) consists essentially of about 90 mole percent vinylidene chloride and about 10 mole percent methyl methacrylate.

4. The process of claims 1, 2 or 3 wherein the end-shot comonomer is selected from the group consisting of methyl acrylate, methyl methacrylate, vinyl chloride, methacrylic acid, and vinyl acetate.

* * * * *